UNITED STATES PATENT OFFICE.

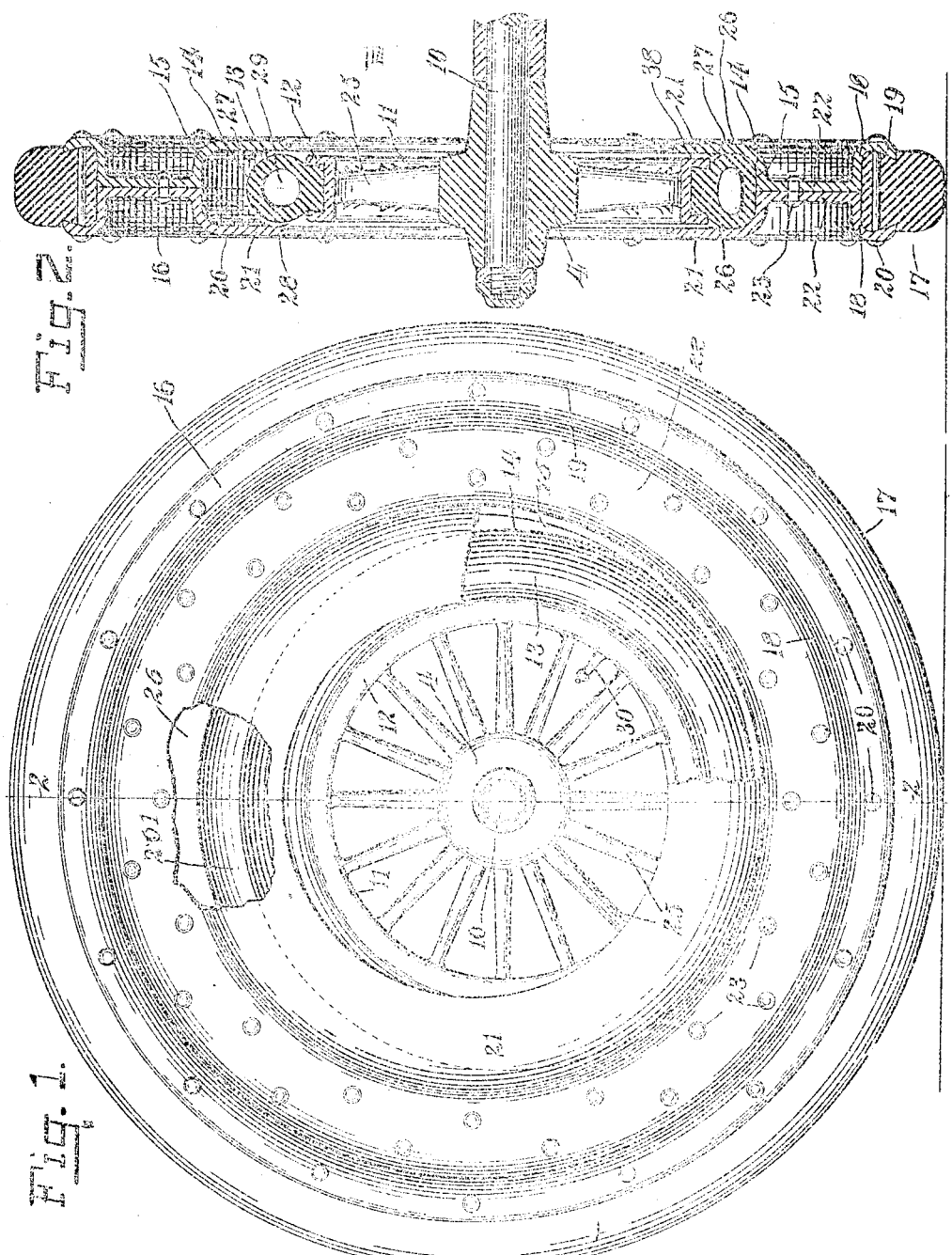

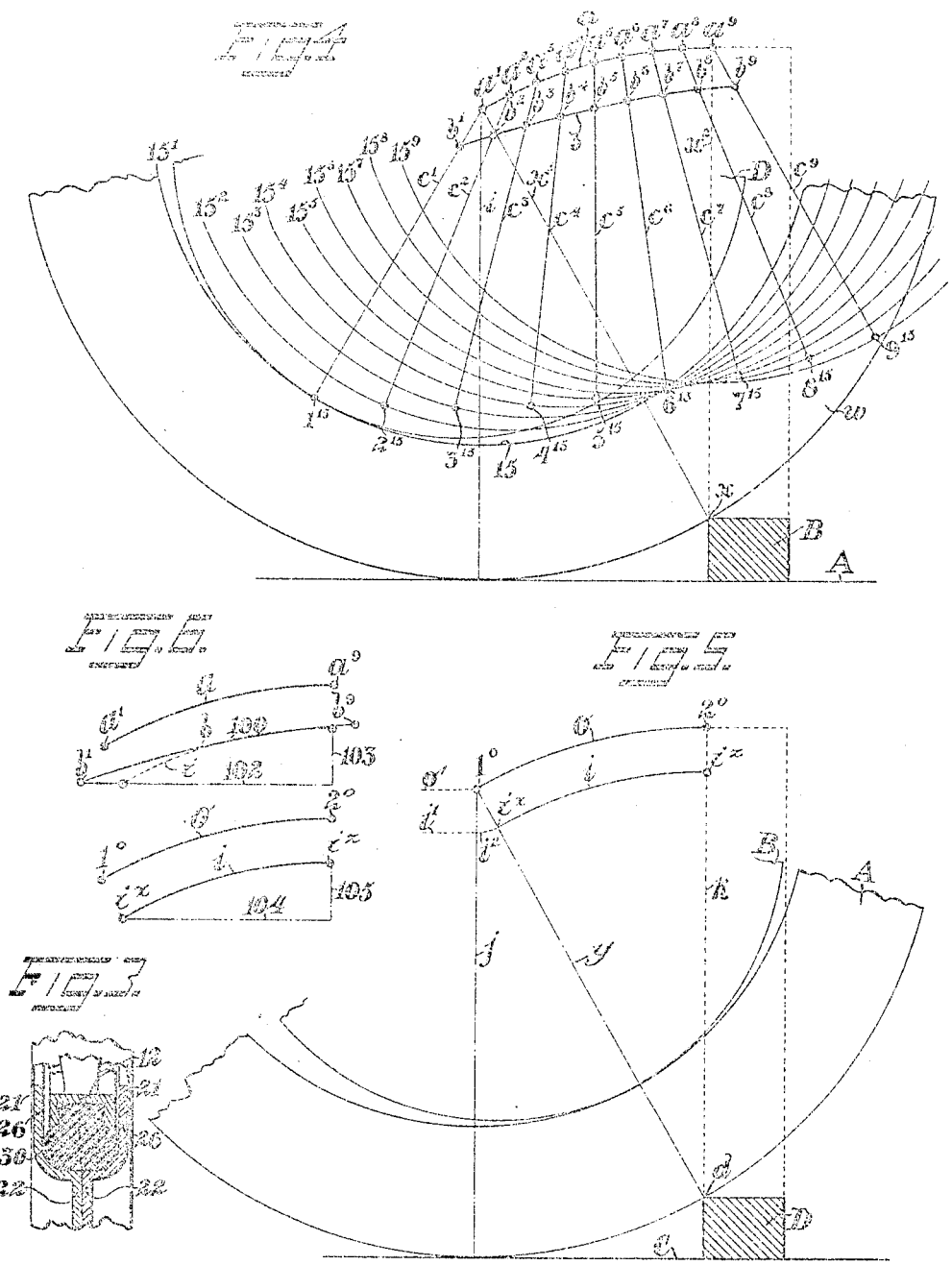

EDWIN STANCLIFF, OF NEW YORK, N. Y.

WHEEL.

No. 892,323.  Specification of Letters Patent.  Patented June 30, 1908.

Application filed April 28, 1906, Serial No. 314,178. Renewed October 14, 1907. Serial No. 397,354.

*To all whom it may concern:*

Be it known that I, EDWIN STANCLIFF, a citizen of the United States, residing in New York, in the county of New York and State of New York, have invented certain new and useful Improvements in Wheels, of which the following is a specification.

This invention relates to vehicle wheels and is especially adapted for use in driving wheels for automobiles and other vehicles.

The improvements embodied in this invention are particularly applicable to that class of vehicle wheels in which a center or inner wheel runs within an outer wheel with sufficient clearance to place the axis of the inner wheel in eccentric relation to the outer wheel. Hereinafter in this specification for convenience the inner wheel, owing to the circumstance that it is illustrated as a driving wheel for the outer wheel, will be called the driver wheel, and the outer wheel, since it affords a track surface for the inner or driver wheel, will be called the track wheel. When occasion arises to refer to the entire structure it will be called the wheel.

One of the objects of the invention is to provide a wheel of this class for automobiles in which the driver wheel shall have such relation to the track wheel that there will be a load-regulated gripping action between the two wheels, the normal off-center relation of the two being so modified and controlled that instead of the axis of the driver wheel tending to run forwardly of the axis of the track wheel, said driver wheel axis will normally tend to take a position backward of the axis of the track wheel.

In the accompanying drawings, Figure 1 is a side elevation of a wheel, embodying the present improvements, some portions being shown broken away for better illustrating some certain feature. Fig. 2 is a cross-sectional view, in line 2—2 of Fig. 1, illustrating one of the preferred forms and arrangements of the wheel. Fig. 3 is a view of that portion of the wheel showing the point of contact between the driver and the track wheel. Figs. 4, 5 and 6 are diagrammatic views illustrative of the mode of operation of my improved wheel as compared with the ordinary off-center wheel.

The wheel, in the form shown in the drawings, is represented of a character particularly intended for use on automobiles, but it will be understood that the improvements may be used for other purposes and that the details and proportions may be modified in various ways and degrees, within the scope and limit of the present invention, for more fully adapting the improvement to different kinds of service and for use in vehicles employed in different kinds of work.

Referring to Figs. 1 and 2, the driver wheel 11 is shown as provided with a hub 4, of ordinary construction, adapted to be carried on or by the usual axle, as 10, of the vehicle. The driver wheel is provided with a proper rim or felly, as 12, for carrying the tire 13, the tread 14 of which runs within and is supported by the tread engaging or track face 15 of the track wheel 16. Said track wheel may have a suitable tire on the exterior thereof, but I prefer to employ for wheels for use on automobiles a rubber or cushion tire of plain and simple construction, as indicated for instance, in a general way, by 17. In practice it will be understood that said tire should be of suitable thickness and width for the load to be carried, and this tire will be removably secured in place in accordance with the usual practice. For this and other purposes of construction the track wheel may be made up of a pair of plates, 18—18, having flanges 19 for engaging the road tire 17, to which they may be secured by bolts 20, flanges 21—21 for receiving the inner tire, and webs 22, which may be secured together in some suitable way, as for instance by rivets 23. The driver wheel is shown as having a hub 4, mounted on an axle and supporting the felly 12 by suitable spokes, as 25.

One of the features of the present improvement relates to the combination with the track wheel 16 and the driver wheel 11 of a yielding inner tire applied between the two wheels, these wheels being in practice constructed for running one eccentrically to the other. The inner tire may be applied in some cases to the track wheel 16, but I prefer to apply the tire 13 herein illustrated to the outer rim 12 of the driver wheel 11. A further feature of this construction is the mobility or expansibility laterally of the inner tire 13 on increase of load or pressure on the driver wheel 11, whereby to obtain the desired gripping action, this being regulated by the variations in load. Said inner tire 13 is shown as fitting relatively freely within the flanges 21 of the track wheel 16 and by reason of this feature it is evident that the tread face 14 of the inner tire 13 will be free to draw away from the track surface 15 of the track wheel 16 at any given point in the circumference of said tire, as such point passes from the lower side around to the upper side. Clearance at 28 is shown in Fig. 2 between the faces 27—26 of the flanges 21 and tire 13 respectively. It will be observed, however, that as regards that portion of the inner tire 13 which is at the lower part of the driver wheel 11, the effect of the load applied to the driver wheel will be to expand the said mobile or elastic tire, thereby causing its side faces 204 to impinge more or less firmly, in accordance with the pressure applied thereto, against the friction faces provided for the purpose, shown in the present illustration between the walls 26—27 of the flanges 21—21 of the track wheel 16. These faces 26—27, for the engagement of the tire upon its lateral or load induced movement, may, with propriety, be termed driving faces, as distinguished from the load supporting or track face 15. This combination and arrangement of the several elements referred to operates, therefore, for producing a frictional impingement or engagement, in the nature of a driving adhesion or gripping action, between the inner tire and the inner faces or walls of the flanges of the track wheel 16, tending to carry the track wheel around with the driver wheel, especially when the driver wheel is forcibly turned on its axis, and thus tends to carry the track-wheel axis forwardly or in advance of the driver-wheel axis. In practice the load will normally cause the point of engagement, or bearing point of the driver wheel, to pass along the inner surface 15 of the track wheel 16 and normally keep near the lower portion of the wheel.

It will be understood that the action of the inner tire herein referred to, will also operate as a cushioning means as between the driver wheel and the track wheel, so that on a sudden shock or increase of load on the driver wheel, when said track wheel shall suddenly strike an obstacle of considerable size, as for instance, a stone lying in the way of the automobile wheel, or by the action of the running gear of the vehicle or otherwise, the mobility of the inner tire will modify the relative vertical movements of the driver wheel. It is thus evident that the mobility or elasticity of the inner tire becomes effective for a plurality of purposes, one for the cushioning of the two wheels as to the vertical positions thereof, and the other for modifying the rotative effect applied by one wheel to the other, whether the wheel be used as a power-wheel or merely as a load-carrying wheel.

For securing a higher degree of mobility or freedom of action as between the tire on the driver wheel and the track wheel, and its track surface 15 and its side walls or friction faces 26, I prefer to employ a tire of the so-called pneumatic type, having an air chamber 29 for inflation through a valve 30, but it will be understood that other kinds of tire, as indicated at 130, may be used, see Fig. 3.

In Fig. 4, the diagram illustrates the track wheel W as running upon the roadway A, and having encountered an obstruction B. At this instant of encounter the axis of the track wheel W is represented at $a^1$, and the axis or center of the driver wheel is represented at the point $b^1$. The tangential line $c^1$, which runs from the point $a^1$ through the point $b^1$ to the inner perimeter 15 of the track wheel W at the point $1^{15}$, indicates the normal off-center relation of the inner and outer wheels when the inner wheel D is acting as a driver for the outer or track wheel and the intergripping between the wheels is properly effective, which normally tends to carry the axis of the track wheel forwardly of the axis of the inner wheel while the wheel is in action. The vertical tangential line $i$, when compared with the tangential line $c^1$, indicates the amount that the axis $b^1$ of the driver wheel is normally behind the axis $a^1$ of the track wheel, owing to the said intergripping relation. The rearward position of the axis of the driver wheel is due to the fact that the tire of the driver wheel, for instance the tire 13, when under load, will engage the surfaces provided for such purpose and turn the track wheel, not by running upon it, but by virtue of the peculiar driving engagement already referred to. The point $1^{15}$ is substantially within the center of the arc of contact between the driver and the track wheels. Upon meeting an obstruction it is evident that the track wheel will thereupon turn on the axis at $x$, which is the point of obstruction encountered by the wheel W. The tangential line $x^1$ is drawn from the initial or normal point of the axis of the track wheel, indicated by $a^1$, to the point $x$. The series of curved lines $15^1$ to $15^9$ will indicate the passage of the track wheel through an angular distance represented between the radial lines $x^1$ and $x^2$, the axis of the track wheel during such movement describing the curve $a$. This curve is shown divided into eight equal portions, set off by the points $a^1$ to $a^9$ inclusive. The point $a^9$ is on the radius line $x^2$, which line passes down to the point $x$. This curve $a$ would be the curve made by the axis of an ordinary solid wheel in striking and surmounting an obstruction. The axle of such solid wheel would move from $a^1$ to $a^9$, and with it carry the vehicle.

In accordance with the present improvements the vehicle will be mounted upon the axle of the driver wheel D, which axle would, at the time of initial engagement with the obstruction, have its axis at a point marked off as $b^1$. The driver wheel D would, while the track wheel were revolving on axis $x$, pass through such a path that its axis would inscribe the diagram curve $b$, which curve is shown as divided off into eight portions, set off by the points $b^1$ to $b^9$. While the track wheel W is revolving upon the point $x$, to surmount the obstruction, the portion of the track face 15 of such wheel which is rearward of the line $x^1$ is gradually rising, as will be seen by referring to the lines $15^1$ to $15^9$ inclusive. Lines $c^1$ to $c^9$ inclusive are drawn from the points $a^1$ to $a^9$, on the curve $a$, to the points $1^{15}$ to $9^{15}$ on the respective circles $15^1$ to $15^9$. The points $1^{15}$ to $9^{15}$ indicate the center of the arc of contact between the two wheels, driver and track wheel, at each of the several positions $15^1$ to $15^9$. By a comparison of the curves $a$ and $b$ it will be seen that the axis of the driver wheel, during the surmounting of the obstruction, travels through a longer or less sharp curve than does the axis of the track wheel, and at the instant the wheels have reached the top of the obstruction, or raised to the full extent of overcoming this, the axis of the driver wheel, as indicated by the point $b^9$, will be about as far ahead of the position occupied by the axis of the track wheel, as indicated by the point $a^9$, as it was behind the same, as indicated by the points $a^1$ $b^1$, at the time of meeting the obstruction. The triangulation $x^2$ and $c^9$ correspond with the triangulation $c^1$ and $i$. The vehicle axle in thus traveling through a longer curve than that traversed by the axis of the track-wheel naturally causes an easier motion of the vehicle.

In Fig. 5 the action of the ordinary off-center wheel is represented, wherein the track wheel is designated by A, the perimeter of the driver wheel by B, the roadway by C and the obstruction by D. In this instance both of the wheels will move together in an orbit of revolution about the axis $d$ in overcoming the obstruction. The axis of the outer wheel is assumed to move from the point $1^o$ to the point $2^o$ inscribing the chart curve $o$. The axis of the inner wheel, during the same time, will be assumed to move from point $i^x$ to $i^z$, inscribing the chart curve $i$. The vertical radius of the track wheel at the instant of striking the obstruction is indicated by $j$, and the vertical radius of the track wheel at the instant this has mounted the obstruction is indicated by $k$. The radius line $y$ passes from the axis of the track wheel through the axis of the driver wheel to the point of engagement with the obstruction, the points $1^o$ and $i^x$ of curves $o$ and $i$ indicate the positions of these axes at this time. The angle $j-y$ indicates the distance which the axis of the driver wheel is forward of the axis of the track wheel when running normally and at the instant of meeting the obstruction.

In Fig. 6, for purposes of comparison, the chart curves $a$ and $b$, $o$ and $i$, are illustrated one below the other. The chart curve $i$ has been dotted over the chart curve $b$ to show the advantages of the intergripping action between the driver and the track wheels, since a much easier curve of the axle traversing the curve $b$ is had from the point $b^1$ on the curve $b$ to the point 100 where the curve $i$ intersects the curve $b$, than the axle will have traversing the curve $i$. It will also be seen at 100 that the axis of the ordinary off-center driver wheel in its curve $i$ passes above the curve $b$ made by the axis of the driver wheel in my improved structure. The base line 102 of the triangle embodying this line, the chart curve $b$, and the line 103 indicating the distance the center or axis of the driver wheel has raised while surmounting the obstruction, may be compared with the base line 104 of the triangulation comprising this base line, the chart line $i$, and the line 105 illustrating likewise the distance the axis of the driver wheel has raised in surmounting an obstruction of equal height. The elevation lines 103 and 105 are substantially equal. Whatever inequality exists is due to the fact that the curve $i$ of the ordinary off-center wheel after raising lowers somewhat, so that instead of giving constant rise there is an undulating motion, which will produce an amount of unpleasant jar to the occupants of the vehicle. It will be seen that the base line 102 is longer than is the base line 104 and that the curve $b$ is longer than the curve $i$ and is at a less angle to the base line, thus indicating a more even motion of the vehicle, since this would be carried by the axle of the driver wheel.

Assuming that an off center wheel were running on the roadway C and the momentum and other forces were such that the axis of the track wheel A were following the dotted line path $o'$ in Fig. 5, and the axis of the driver wheel B were traversing the dotted line path $i'$, both paths being parallel with the roadway C, with the wheels in such relation that the vertical radius of the outer wheel coincides with the vertical radius of the inner wheel, that is, instead of the center of the arc of contact between the wheels being at the line $y$, the center of the arc of contact between the wheels will be assumed to be at the line $j$, at this time the track wheel A meeting the obstruction D, it will be halted momentarily and the driver wheel B will then run forward on the track wheel and its center will inscribe a down curve $i^2$, which curve will, in the present instance, be assumed to extend from the line $j$ to the line $y$. This will then bring the axes of the wheels to the positions indicated by $1^o$ and $i^x$ on the respective charts $o$ and $i$, at which time both wheels will rotate upon the axis $d$, which is the corner of the obstruction D. The axis of the driver wheel, which driver wheel will carry the axle of the vehicle, will then follow a path indicated by the curve $i$. The curve $i^2$ indicates the action of the wheels just prior to the movement of the track wheel about the axis $d$. The track wheel in the instance just discussed was assumed to momentarily halt, that is, during the time the axis of the driver wheel traversed the curve $i^2$. In Fig. 4, however, the curve $b$ has been developed during the continued movement of both wheels. In practice, of course, there may be a pause or dwell in the forward movement of the track-wheel upon meeting any considerable obstruction, and this dwell though it may continue only for a very short period of time, will modify the curvature of the path traversed by the driver wheel as this runs down the track surface of the track wheel, and so reduce the shocks which would otherwise occur.

A further feature illustrated in the drawings is the combination with the wheels 11 and 16, the driver and track wheels, of a cushion tire 17 for the track wheel 16, upon the outer circumference of this, combined with the cushion tire 13 between the inner circumference of the track wheel 16 and the outer circumference of the driver wheel 11. Thus there is provided, in the complete wheel, a means for dividing the duty of cushioning the vehicle axle from shocks and such sudden movements as are due thereto, by a plurality of cushion tires, only one of which tires is subjected to the abrasion of the roadway and the other of which is operative between curved surfaces which are relatively only slightly divergent from one another. By reason of this organization of mechanism, so to speak, the outer tire 17 may be of relatively low elasticity or mobility while the inner tire may be of a relatively high degree of elasticity and consequently of a high efficiency in its cushioning action, and because of these circumstances said inner tire may be of a sensitive and quick acting quality that would render it inefficient as the exterior tire on the track wheel that was to run directly upon the roadway.

It should be noted that one feature of my improvements relates to the sidewise cushioning of the two wheels, the driver and the track wheel, relative to each other; this being accomplished in the present instance by the arrangement of the inner tire 13 relative to the friction or gripping faces, whereby said tire, projecting laterally over the rim 12 of the driver wheel 11, serves to secure a suitable amount of space at 38 without making said space so great as to interfere with the proper operation of the wheel. When the lateral movement of the track wheel 16 extends a moderate amount, relative to the rim of the driver wheel 11, the two wheels will come into positive engagement and thus protect the inner tire from too great displacement laterally.

It will be noted that one effect of the spreading of the inner tire 13 between and to frictionally engage the faces 26—27 of the walls 21—21, this spreading being due to the load, will operate to frictionally lock the driver wheel 11 upon the track wheel 16, and when this is a traction wheel to thereby transmit the driving power more effectively from the driver wheel to the track wheel.

One effect of the use of the cushion tire between the two wheels 11 and 16 is to restrict the forward and backward reciprocatory action, which might in some cases take place, of the track wheel 16 relatively to the driver wheel 11 by reason of the character of the roadway or otherwise.

Having described my invention I claim:

1. The combination with a track wheel having a centrally disposed opening, of a drive wheel located within said opening, the perimeter of said drive wheel being located in the plane of the inner perimeter of the track wheel, and an elastic tire carried by one wheel for running upon the perimeter of the other, and that other having faces engaging the side faces of the tire when under load.

2. The combination with a track wheel having a centrally disposed opening, of a drive wheel located within said opening, the perimeter of said drive wheel being located in the plane of the inner perimeter of the track wheel, and an elastic tire carried by one wheel for running upon the perimeter of the other, and that other having faces engaging the side faces of the tire when under load, the relative sizes of the tire and the perimeter upon which it is to run being such that there will be a clearance between them.

3. The combination with an inner and an outer wheel, of flanges carried upon one wheel and affording a space opening toward the other, and an elastic tire carried by said other wheel of such proportions that it will expand and engage by its side faces the flanges at the segment of contact between the wheels when load is applied and clear the same when unloaded.

4. The combination with an outer or track wheel having a centrally disposed opening, of an inner or drive wheel located within said opening, means carried by each wheel for engaging the other, one of said means being elastic and having its strongest engagement upon the radial line running from its axis to its point of engagement with the track wheel.

5. The combination with an outer or track wheel having a centrally disposed opening, of an inner or drive wheel located within said opening, and means carried by each wheel for engaging the sides of the other, one of said means being elastic and having its strongest side engagement upon the radial line running from its axis to its point of engagement with the track wheel, and means for adjusting the force of said side engagement.

6. The combination in a vehicle wheel, of an inner and an outer wheel, said outer wheel being comprised of a pair of plates riveted together and having outwardly projecting flanges for engaging the outer tire and inwardly projecting flanges forming a tread seat for an inner tire, a tire located within said outwardly projecting flanges, bolts for securing the same in position, such inner wheel embodying a hub, spokes radiating therefrom, a felly carried by said spokes, an inflatable elastic tire carried by said felly, a valve for inflating the tire, said tire being located between the inwardly projecting flanges of the outer wheel and when free from load being of less diameter than the space between said flanges, and when under load engaging by its side faces the faces of said flanges.

7. In a vehicle wheel, the combination with an inner and an outer wheel, of an elastically yieldable tire positively carried by the inner wheel for running upon a track face of the outer wheel and normally free from said track face except at a position adjacent to the radial line from the axis to the point of engagement with said track face.

8. In a vehicle wheel, the combination with a track wheel and a center wheel, one of these wheels having oppositely disposed driving surfaces, of a relatively mobile member on the other of said wheels and located and adapted for engaging with said driving surfaces and operable by the variation of the load on the center wheel for varying the driving engagement between the two wheels.

9. In a vehicle wheel, the combination with a track wheel, of a center wheel, one of said wheels having oppositely disposed engaging surfaces, and a relatively mobile member on the other of said wheels located and adapted for engaging with said surfaces and operable by the variation of the load on the center wheel for varying the driving engagement between the two wheels, whereby to normally carry the axis of the track wheel forward of the axis of the driving wheel while the wheel is in action.

10. In a vehicle wheel, the combination with a track wheel, having a track face and a pair of oppositely disposed driving engaging surfaces, of a center driving wheel, and a relatively mobile member on the said driving wheel for running on said track face and located between and adapted for variably engaging said surfaces upon the variation of load on the driving wheel for varying the driving force of the driving wheel upon the track wheel.

Signed at Nos. 9–15 Murray street, New York, N. Y., this 27th day of April, 1906.

EDWIN STANCLIFF.

Witnesses:
 JOHN S. BENTLEY,
 JOHN O. SEIFERT.